(12) United States Patent
Ray et al.

(10) Patent No.: US 10,885,286 B2
(45) Date of Patent: Jan. 5, 2021

(54) SIMULTANEOUS AND REAL TIME TRANSLATION AND LANGUAGE SWITCHING ACROSS A SET OF FEATURES

(71) Applicant: Microsoft Technology Licensing, LLC, Redmond, WA (US)

(72) Inventors: Paul Ronald Ray, Kirkland, WA (US); Michael Tholfsen, Newcastle, WA (US); Guillaume Simonnet, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 16/159,440

(22) Filed: Oct. 12, 2018

(65) Prior Publication Data
US 2020/0117713 A1  Apr. 16, 2020

(51) Int. Cl.
G06F 40/58   (2020.01)
G06F 16/48   (2019.01)
G06F 40/45   (2020.01)
G10L 13/10   (2013.01)
G10L 13/00   (2006.01)

(52) U.S. Cl.
CPC .............. G06F 40/58 (2020.01); G06F 16/48 (2019.01); G06F 40/45 (2020.01); G10L 13/00 (2013.01); G10L 13/10 (2013.01)

(58) Field of Classification Search
CPC ........... G06F 40/58; G06F 16/48; G10L 13/00
See application file for complete search history.

(56) References Cited

U.S. PATENT DOCUMENTS 5,893,133 A * 4/1999 Chen ..................... G06F 40/53
                                                      715/264
5,987,401 A * 11/1999 Trudeau ................. G06F 40/58
                                                      704/2
6,377,925 B1* 4/2002 Greene, Jr. ............. G10L 21/06
                                                      379/52

(Continued)

FOREIGN PATENT DOCUMENTS

WO     2008120031 A1   10/2008

OTHER PUBLICATIONS

Herrmann, Francoise, "Le Visuel Multimedia 3", Retrieved From: http://www.fhphd.org/Visuel.html, Oct. 2002, 3 Pages.

(Continued)

*Primary Examiner* — Anne L Thomas-Homescu
(74) *Attorney, Agent, or Firm* — Talem IP Law, LLP

(57) ABSTRACT

A computer-implemented method that may be carried out by a reader device or other computing device includes identifying boundaries of words and sentences of displayed content and receiving a language selection of a language for translating a selected unit of text in the displayed content; translating the unit of text to the selected language; retrieving from a picture dictionary, a pictogram associated with a tag applied to the word or at least one word from the sentence of the selected unit of text; generating pronunciation files for both an original language of the unit of text and the selected language; and displaying, in context with the displayed content, the unit of text in the original language and the selected language, the pictogram, and icons for requesting to play the pronunciation files. The selected unit of text can be a word or a sentence.

18 Claims, 14 Drawing Sheets

(56) References Cited

U.S. PATENT DOCUMENTS

| | | | |
|---|---|---|---|
| 6,999,916 B2* | 2/2006 | Lin | G06F 40/58 704/8 |
| 10,067,939 B2* | 9/2018 | Na | G10L 25/30 |
| 10,303,771 B1* | 5/2019 | Jezewski | G06F 40/30 |
| 10,509,862 B2* | 12/2019 | Wang | G06F 40/289 |
| 2003/0154069 A1* | 8/2003 | Carew | G06F 40/58 704/7 |
| 2005/0209844 A1* | 9/2005 | Wu | G06F 40/129 704/2 |
| 2006/0136824 A1* | 6/2006 | Lin | G06F 40/47 715/264 |
| 2007/0282592 A1* | 12/2007 | Huang | G06F 40/289 704/9 |
| 2011/0097693 A1* | 4/2011 | Crawford | G09B 5/065 434/157 |
| 2011/0137636 A1* | 6/2011 | Srihari | G06F 40/53 704/2 |
| 2012/0109632 A1* | 5/2012 | Sugiura | G10L 15/20 704/3 |
| 2014/0081626 A1* | 3/2014 | Chang | G06F 40/30 704/9 |
| 2014/0168716 A1* | 6/2014 | King | G06F 16/5846 358/473 |
| 2014/0237425 A1* | 8/2014 | Chan | G06F 3/0482 715/810 |
| 2015/0227509 A1* | 8/2015 | Landau | G06F 40/58 704/2 |
| 2017/0287356 A1* | 10/2017 | Stephen | G09B 19/06 |
| 2018/0052828 A1* | 2/2018 | Na | G10L 25/30 |
| 2018/0225375 A1* | 8/2018 | Collins | G06F 16/9032 |
| 2018/0322103 A1* | 11/2018 | Yeo | G06F 40/279 |
| 2019/0139427 A1* | 5/2019 | Fitzpatrick-Nash | G09B 5/06 |
| 2020/0103978 A1* | 4/2020 | Mixter | G06F 3/017 |

OTHER PUBLICATIONS

Klein, Andre, "5 Best German-English Dictionaries Online, Offline, Apps & Add-Ons", Retrieved From: https://learnoutlive.com/german-english-dictionary/, Jun. 8, 2017, 10 Pages.

"International Search Report and Written Opinion Issued in PCT Application No. PCT/US19/053327", dated Nov. 26, 2019, 12 Pages.

"Picture dictionary for mobile", Retrieved From: https://sway.office.com/6RYHsopvNi9EeTew, Retrieved on: Jul. 12, 2018, 4 Pages.

Ansaldo, Michael, "4 Google Translate features you'll use every day", Retrieved From: https://www.pcworld.com/article/3196260/software/4-google-translate-features-youll-use-every-day.html, May 24, 2017, 6 Pages.

Doan, Anh, "Picture Dictionary—Multi Language", Retrieved From: https://appadvice.com/app/picture-dictionary-multi-language/1130165462, Jul. 2, 2016, 3 Pages.

Ruzysk, et al., "Session Text-To-Speech Conversion", Application as Filed in U.S. Appl. No. 15/491,854, filed Apr. 19, 2017, 41 Pages.

* cited by examiner

Metamorphosis

One morning, when Gregor Samsa woke from his troubled dreams, he found himself transformed in his bed into a horrible vermin. He lay on his armour-like back, and if he lifted his head a little he could see his brown belly, slightly domed and divided by arches into stiff sections. The bedding was

SIMULTANEOUS AND REAL TIME TRANSLATION AND LANGUAGE SWITCHING ACROSS A SET OF FEATURES

BACKGROUND

Software learning tools for literacy development and education are a growing industry for improving outcomes from preschool through higher education. Through use of these software tools, learners may be able to improve a wide range of literacy skills, including comprehension, reading fluency, and written expression.

Certain features of learning tools can be beneficial for improving authoring of text, sustaining attention and improving reading speed, improving comprehension, supporting grammar instruction and comprehension, and improving word recognition and pronunciation.

Some learning tools are helpful for learning a second (or other) language. Such learning tools can include providing translations from one language to another language.

BRIEF SUMMARY

Learning tools and readers with simultaneous and real time translation and language switching across a set of features are described.

A computer-implemented method that may be carried out by a reader device or other computing device includes identifying boundaries of words and sentences of displayed content and receiving a language selection of a language for translating a selected unit of text in the displayed content; translating the unit of text to the selected language; retrieving, from a picture dictionary, a pictogram associated with a tag applied to the word or at least one word from the sentence of the selected unit of text; generating pronunciation files for both an original language of the unit of text and the selected language; and displaying, in context with the displayed content, the unit of text in the original language and the selected language, the pictogram, and icons for requesting to play (or play back) the pronunciation files. The selected unit of text can be a word or a sentence.

When learning features are applied to the text, the same features can be applied to the translated unit of text as currently applied to the unit of text in the original language.

An analysis pipeline is provided that supports the simultaneous and real time translation and language switching across a set of features and includes performing syntaxic analysis of the at least the portion of the content to at least identify spaces and periods; categorizing text identified by the spaces and periods into categories comprising word and number; performing language detection to determine a character set for the words; and performing language-specific semantic analysis of the words. The analysis pipeline can further include speech playback, grammatical analysis and syllabification for the detected language(s) as well as for the content translated to a selected language.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Learning tools and readers with simultaneous and real time translation and language switching across a set of features are described.

The original language and the translated text with applied features can be visually indicated and presented in real time to compare and contrast and even to explore (e.g., with definitions, sound, etc.). The learning tools provide the content when the user wants it. That is, when a user turns a feature on, the feature appears applied to the text (and is applied to the original language and the translated text).

Some example features that may be included in the set of features available for a learning tool incorporating the described translation and language switching include, but are not limited to, tools that read text out loud, break the text into syllables (syllabification), adjust spacing between lines and letters (e.g., line and font spacing), and identify parts of speech (with visual cues including color and/or notation). Furthermore, a picture dictionary can be provided such that the word can be more easily associated with the object to which it represents.

Translation is possible in one or more modes including, but not limited to, whole document translation, per word translation, and per sentence translation.

With the per word translation, each word can have a dictionary definition and a picture dictionary associated therewith. Per sentence translation is possible through the boundary identification, which uses the structure of the text, spacing, and punctuation to identify the boundary of a sentence. Parts of speech and syllables and picture dictionary have meanings on a per sentence translation.

An analysis pipeline is provided that supports the language switching across the set of features.

The described learning tools can be advantageous for foreign language learners, learners with dyslexia or other reading disorders, and those learners with dyslexia or other reading disorders who are also learning a foreign language.

Figure 1A:
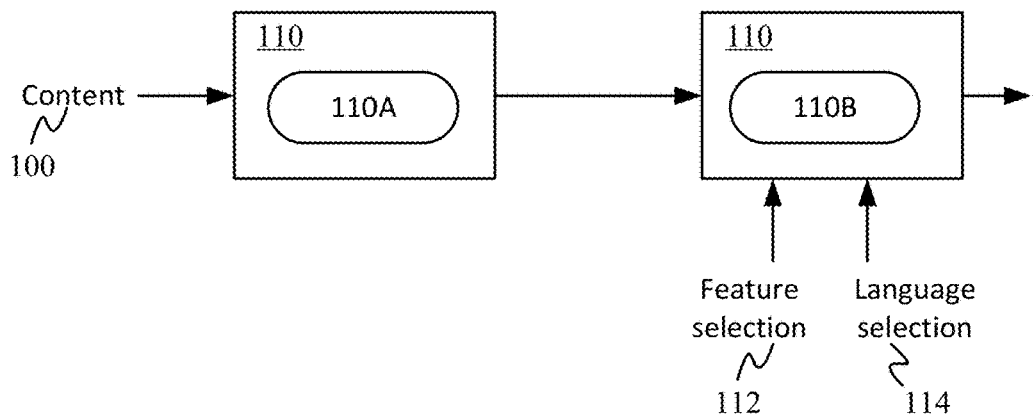
FIGS. 1A and 1B illustrate an analysis pipeline supporting simultaneous and real time translation and language switching across a set of features.
Figure 1B:
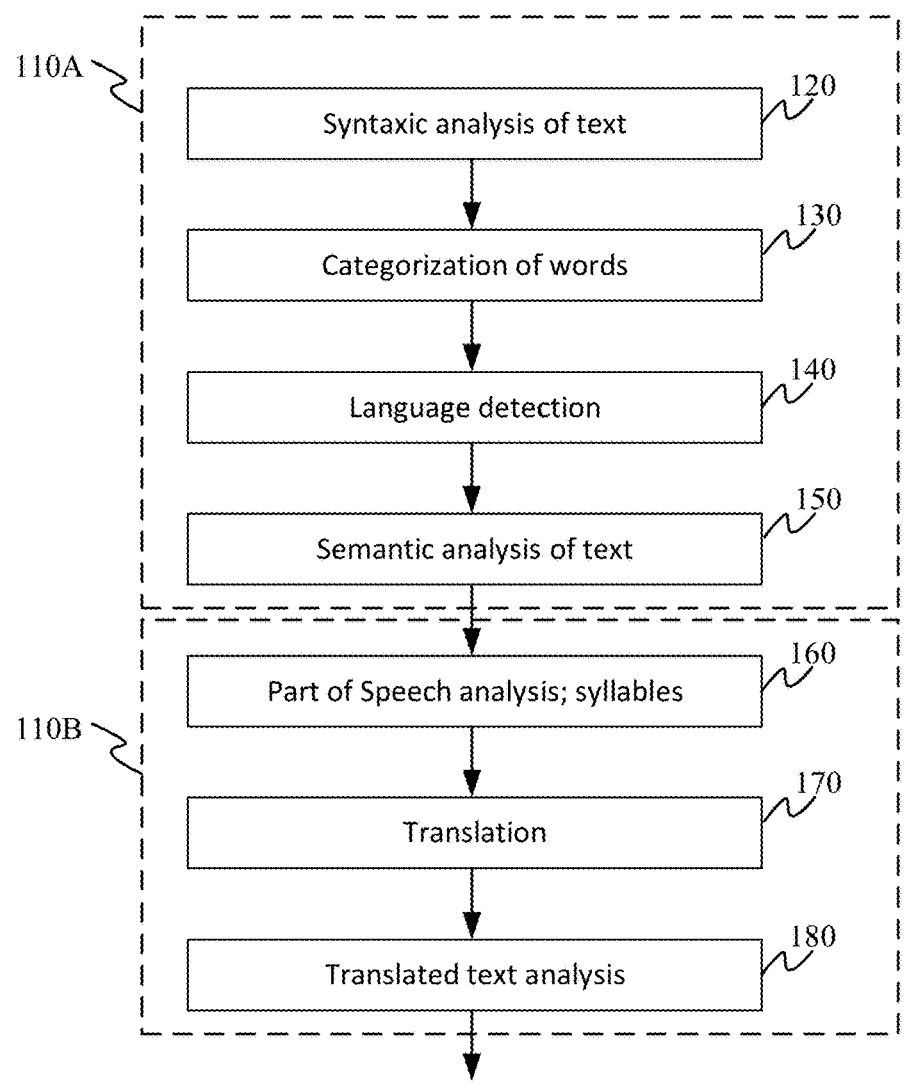

FIGS. 1A and 1B illustrate an analysis pipeline supporting simultaneous and real time translation and language switching across a set of features. Referring to FIG. 1A, content 100 is analyzed by a system 110 executing the processing instructions for carrying out the analysis pipeline. The analysis pipeline is shown in two parts, 110A and 110B, for conceptual purposes where processes 110A are carried out for all content and processes 110B can further include application of a variety of features based on default feature selections from the available feature set and/or user-selected feature selections from the available feature set. As shown, processes 110B are carried out based on feature selection 112 and language selection 114.

Referring to FIG. 1B, the analysis pipeline begins with syntaxic analysis of text (120) from the content 100. Syntaxic analysis of the text includes the breakdown of spaces and periods. Syntax refers to the patterns of formation of sentences and phrases from words and the rules for the formation of grammatical sentences in a language. Syntax differs from parts of speech as syntax refers to the set of rules, patterns, and processes by which words are put together, whereas parts of speech refer to the different types of words that can be used. The syntaxic analysis can be carried out by a syntax analyzer or parser that analyzes the token stream (representing the text, including punctuation and spaces of the document) against the syntax rules. The syntaxic analysis can be based on W3C standards. Next, categorization of words (130) is carried out. The categorization of words identifies whether the text (or characters) is a word, number, email address, or other predetermined category. Then, language detection (140) can be carried out.

Language detection provides the ability to identify multiple languages in the same text (e.g., tag the fragments of text) and to revert back to the original text after converting. For example, a document may have text in both English and French and the user selects to translate the text to German. Since the pipeline includes language detection, the system can understand which units of text are translated back and forth to what language.

Language detection determines the character set in use and can involve trigrams, which is a common technique in natural language processing to make a prediction for a word based on the two words prior. Of course, other n-grams such as bigrams, 4-gram and 5-gram may be used. Content may include words in multiple languages and the described pipeline can assign/detect language on a per word or per sentence basis (since syntaxic analysis and word categorization are performed before language detection). The detected language for each fragment of text is indicated as a tag.

Language-specific semantic analysis of text (150) is then carried out. In some cases, language-specific semantic analysis can be performed using natural language technologies.

The described pipeline helps to identify if there are abbreviated words like "Mr." with a period at the end but that do not signify the end of a sentence, as well as other analysis specific to each language.

With a breakdown of the boundaries for words and sentences, the processes 110B can be applied. In particular, learning features (e.g., based on feature selection 112) can be applied (160). The learning features may include parts of speech analysis and syllabification, as well as picture dictionary. For example, each sentence can be analyzed (e.g., via a speech analysis service(s)) to recognize tokens (that form the sentence) as words and their parts of speech, and the words can be tagged with their parts of speech. In addition, when syllabification is specified as one of the selected features, syllables can be identified for each word. The syllabification may also be via a service call to a service that provides the syllables of a word.

Words can also be tagged with an identifier that can be used to identify an appropriate picture from a picture dictionary. In addition, the system can identify the appropriate picture based on the sentence. In one scenario, the root word of the recognized word is used (e.g., "run," "running," and "ran" are all normalized to "run" the verb, and a picture is associated to that word). The picture identified from the picture dictionary depends on the part of speech. For example, the word "park" can have the appropriate picture identified based on the location in the sentence. Given the sentence "I like to go to the park", the word "park" is a noun (and may even be identified as part of the predicate of the sentence). Given the sentence "I parked the car," the word "parked" is a verb (and the root word "park" or "to park" or the gerund version "parking" may be used to identify the appropriate picture in the picture dictionary).

When there is a language selection 114, the appropriate section of the content can be translated (170). In some cases, translation services can be called to obtain a translation of the section of content that is selected by the user (e.g., the unit of text). The appropriate section (e.g., unit of text) can be based on the setting, which can include per word, per sentence, and whole document translation, as some examples. A selected language and selected text can be received at any time. Once the language and text selection are received (and translation obtained), translated text analysis (180) is carried out. The translated text analysis is similar to the process(es) carried out in operation 160, but for the selected word(s) in the selected language. For example, any of the learning features applied to the original text are applied to the translated text, including, but not limited to, part of speech analysis and syllabification. In some cases, no additional action needs to be taken to identify a picture dictionary picture since the original text has a tag with the corresponding image.

Figure 2:
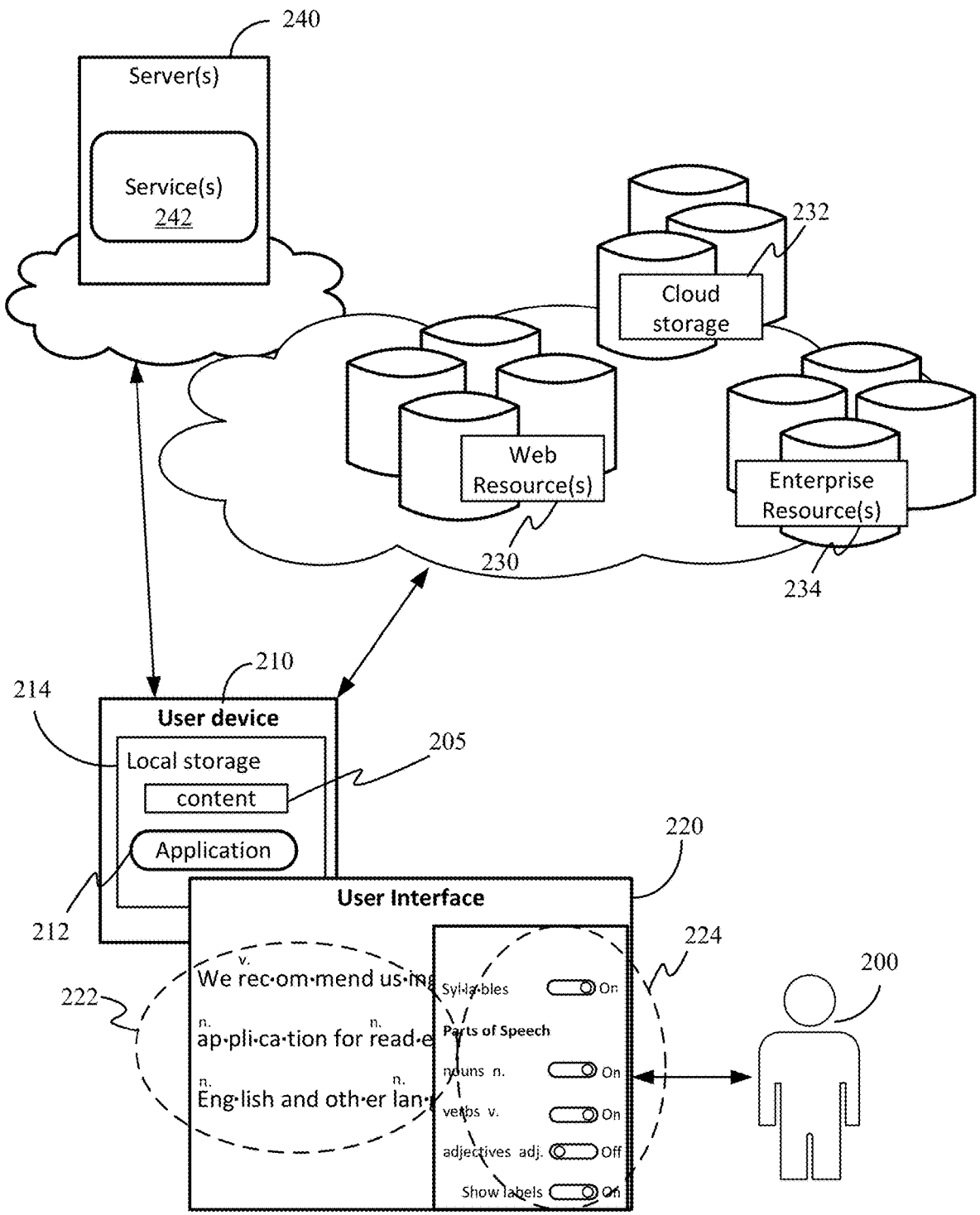
FIG. 2 illustrates an example operating environment.

FIG. 2 illustrates an example operating environment. Referring to FIG. 2, a user 200 can consume content 205 on a computing device 210, which may be embodied by computing device 800 of FIG. 8. An application 212, executed by the computing device 210, can include a learning tool providing simultaneous and real time translation and language switching across a set of features. In some cases, application 212 utilizes one or more services 242 executed by server(s) 240 to perform certain of the processes for the simultaneous and real time translation and language switching. For example, server(s) 240 may host translation services. It should be understood that server(s) 240 and service(s) 242 may be provided by a single entity or by different entities.

Application 212 can provide a user interface 220 through which user 200 consumes content 205 (e.g., as displayed content 222, which can include a variety of visual cues according to the applied learning features). User interface 220 can also include icons or other graphics to enable feature selection (224). In the illustrated example, the user interface 220 shows feature selections 224 of a set of features including, syllables and parts of speech, which are reflected in the displayed content 222.

Content 205 may be stored in local storage 214 of the computing device 210. In some cases, content 205 may be initially received from web resource(s) 230, cloud storage 232, or enterprise resource(s) 234 (cloud-based or local network).

The user interface 220 may be generated on computing device 210 or it may be generated from a cloud server (not shown) and sent to the computing device 210 for display. The user interface 220 may be generated as part of a service, and it may be integrated with other services, such as productivity services, social networking services and information management services.

Figure 3:
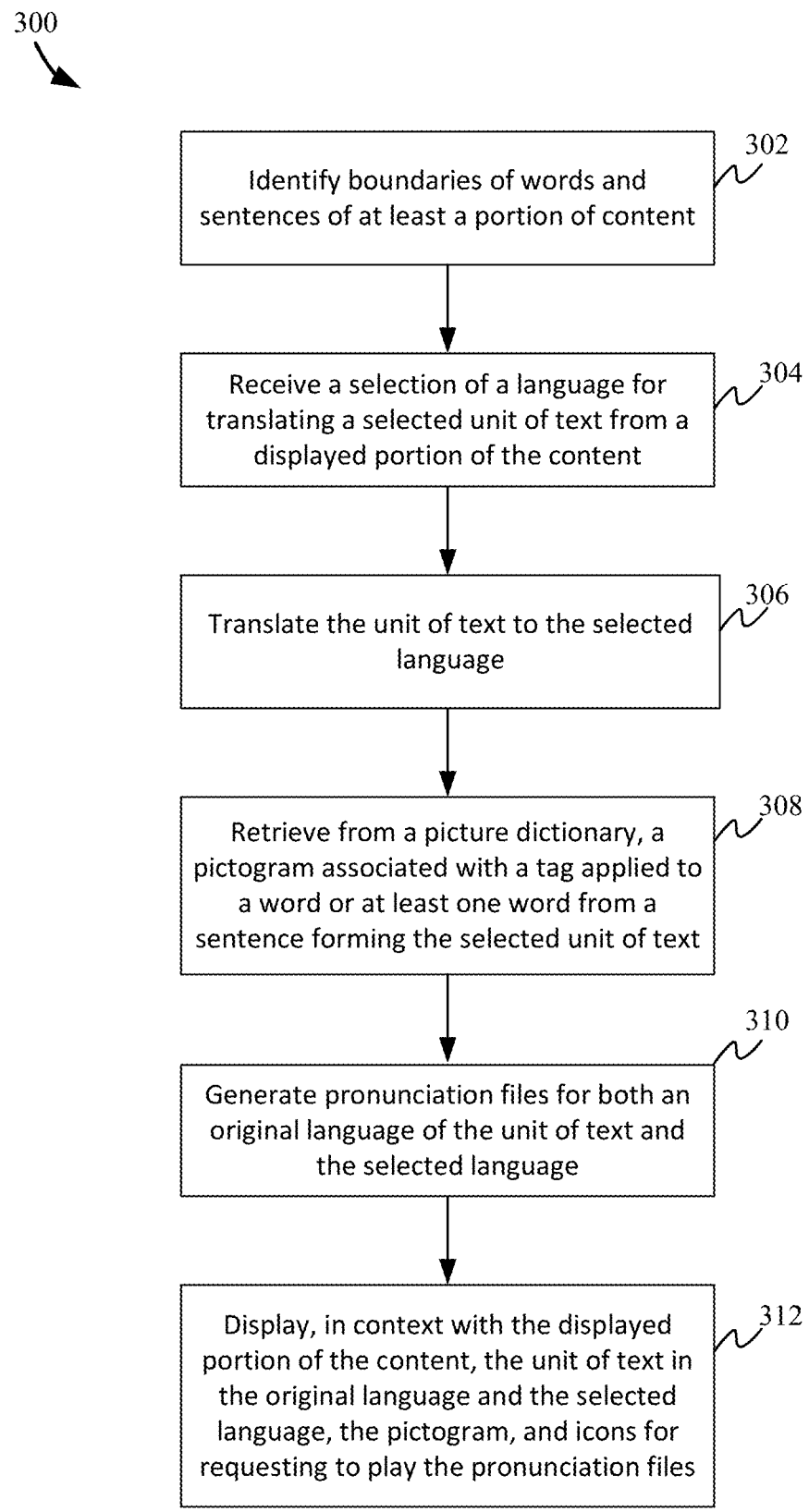
FIG. 3 illustrates an example process for a learning tool.

FIG. 3 illustrates an example process for a learning tool. Process 300 may be carried out by a reader device or other computing device, such as computing device 210 of FIG. 2. In some cases, application 212 of FIG. 2 may include instructions to perform process 300. Referring to FIG. 3, process 300 includes identifying (302) boundaries of words and sentences of at least a portion of the content. Process 300 can further include receiving (304) a selection of a language for translating a selected unit of text from a displayed portion of the content; and translating (306) the selected unit of text to the selected language. The selected unit of text can be a word or a sentence. The ability to select the word or a sentence for translation may be based, at least in part, on the step of identifying the boundaries of the words and sentences. In some cases, the processes described as part of the pipeline part 110A of FIGS. 1A and 1B are performed to prepare the content for the selection of the language for translation, as well as the ability to select a unit of text in the form of a word or sentence since the outcome of pipeline part 110A includes the identification of the boundaries of the words and sentences. Learning features, such as those described in operation 160 of FIG. 1B, can be applied at any time to the text Process 300 further includes retrieving (308) from a picture dictionary, a pictogram associated with a tag applied to the word forming the selected unit of text or at least one word from the sentence forming the selected unit of text; generating (310) pronunciation files for both an original language of the unit of text and the selected language; and displaying, in context with the displayed portion of the content, (312) the unit of text in the original language and the selected language, the pictogram, and icons for requesting to play the pronunciation files.

The generating of the pronunciation files can be accomplished using text to speech or by identifying the appropriate audio file for that word from previously generated files. The pronunciation files can be speech, speech audio, speech audio files, or some other equivalent file type.

It should be understood that although the term "tag" is used herein to describe how metadata is associated with a particular fragment of text, the underlying data structure may be any suitable structure including, but not limited to, tables, graphs, and lists.

Figure 4A:
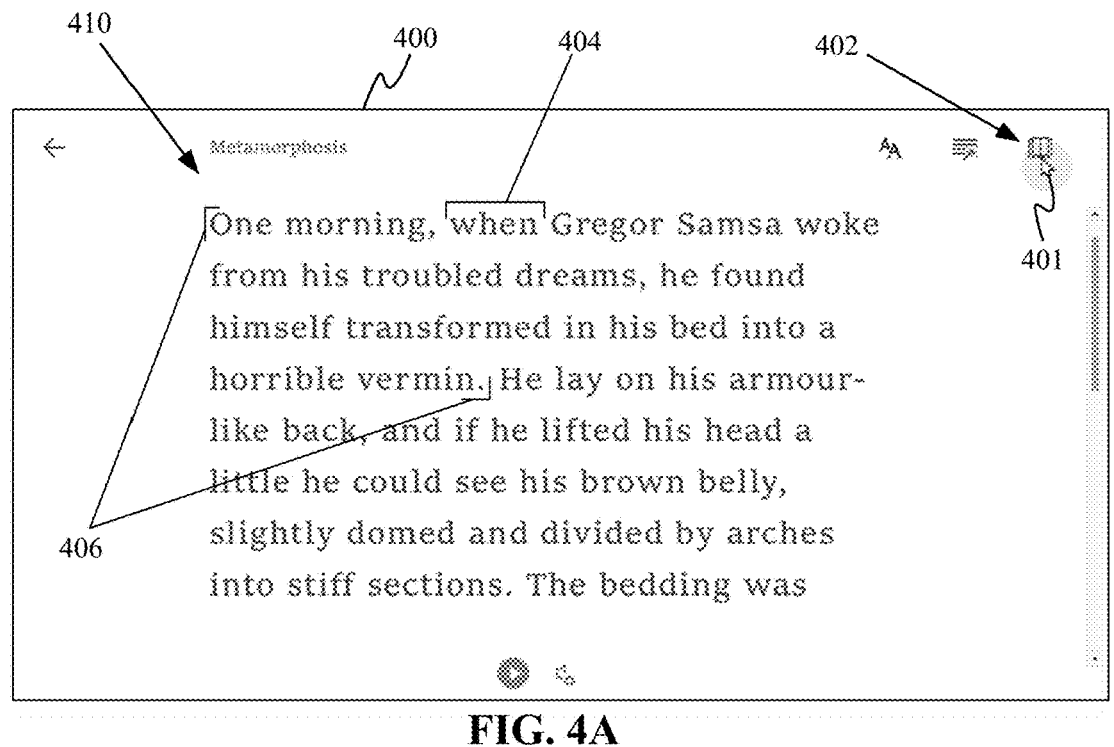
FIGS. 4A-4C illustrate an example scenario for real-time translation.
Figure 5B:
Figure 5C:
Figure 5D:
Figure 6A:
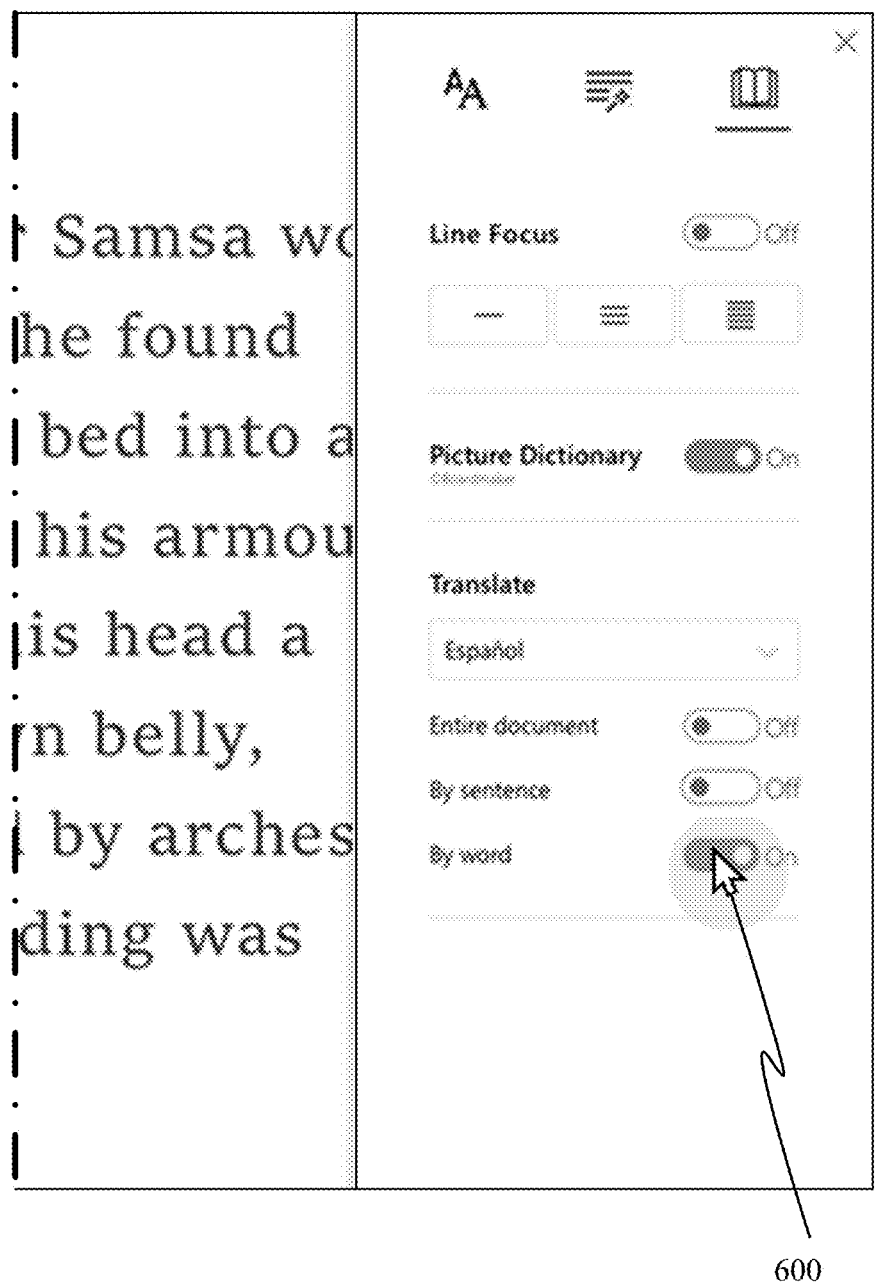
FIGS. 6A and 6B illustrate an example scenario for real-time translation and language switching on a per word basis with a set of features applied.
Figure 6B:
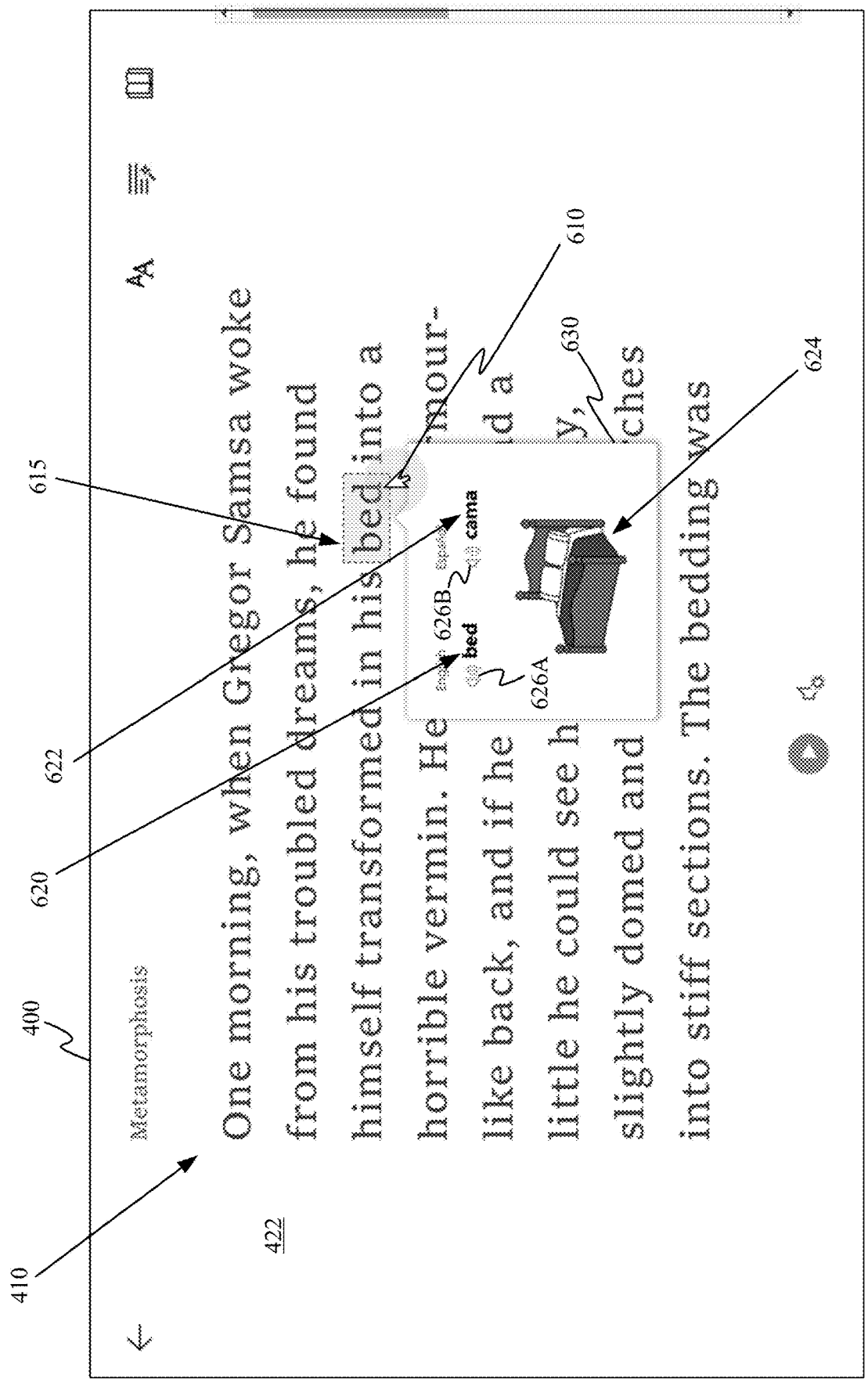
Figure 7A:
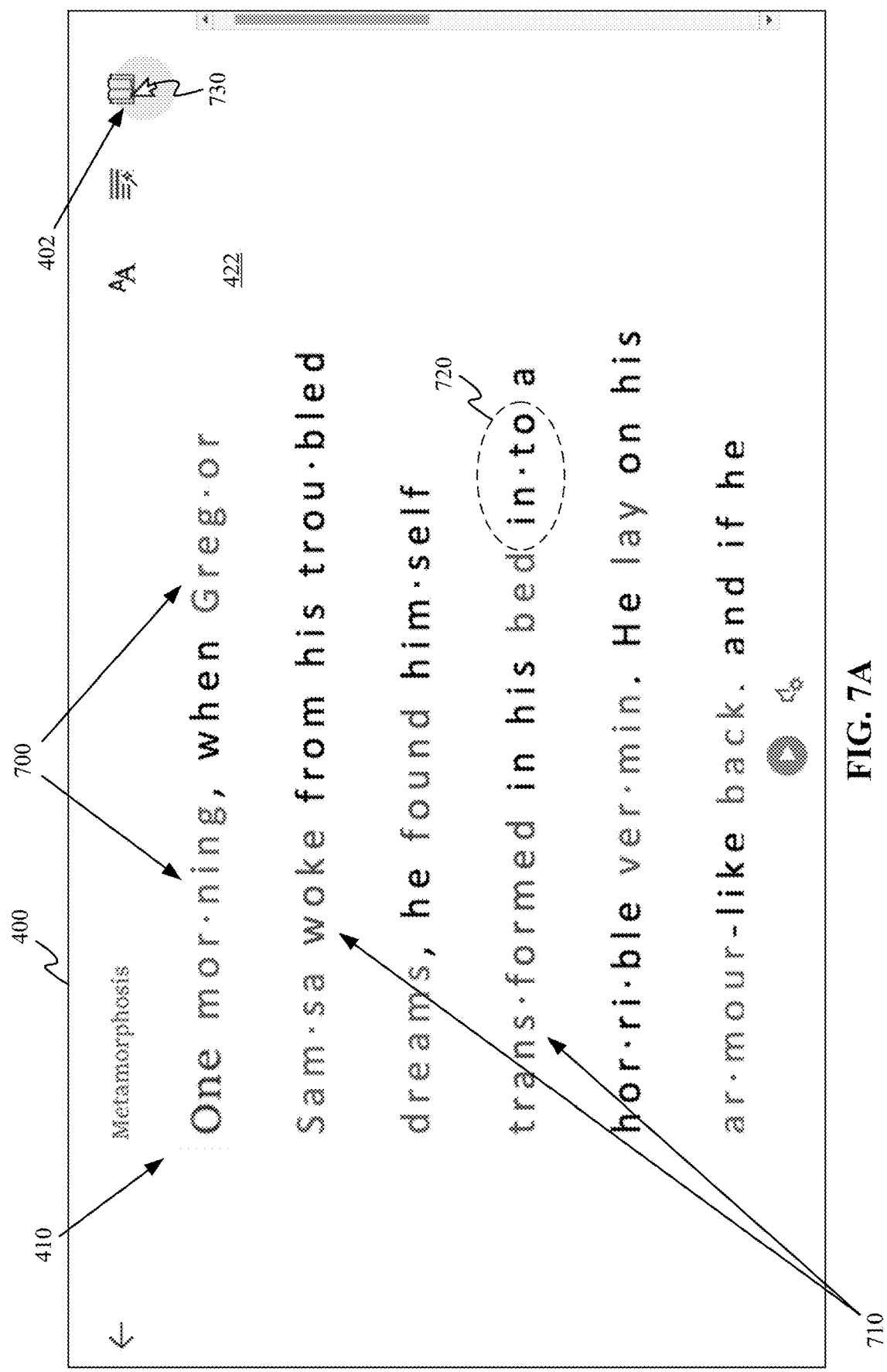
FIGS. 7A-7C illustrate an example scenario for real-time translation and language switching on a "whole document" basis with a set of features applied.
Figure 7B:
Figure 7C:
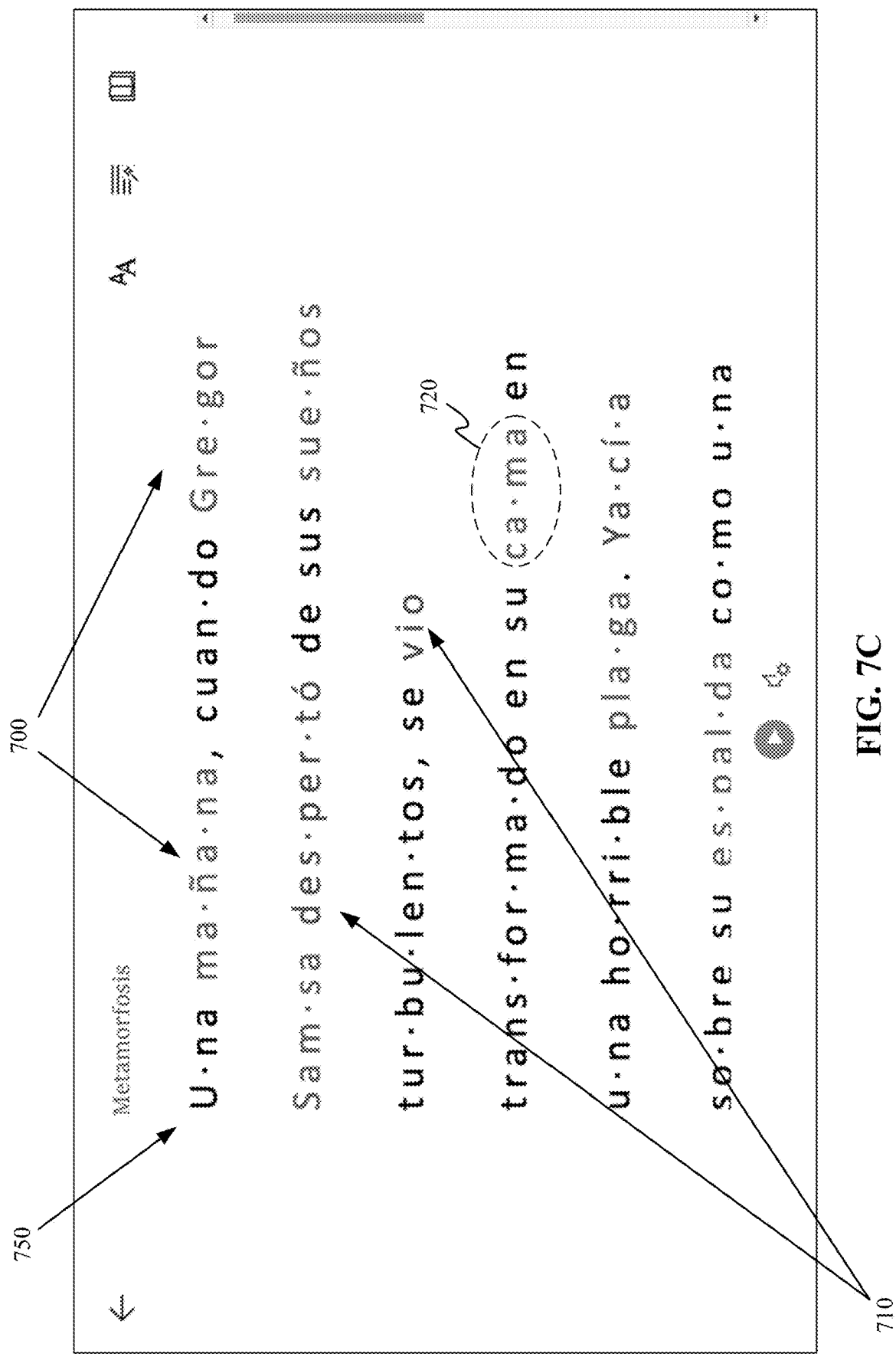

FIGS. 4A-7C provide example scenarios of a content consumption application with simultaneous and real time translation and language switching across a set of features. FIGS. 4A-4C illustrate an example scenario for real-time translation; FIGS. 5A-5D illustrate an example scenario for real-time language switching on a per sentence basis; FIGS. 6A and 6B illustrate an example scenario for real-time translation and language switching on a per word basis with a set of features applied; and FIGS. 7A-7C illustrate an example scenario for real-time translation and language switching on a "whole document" basis with a set of features applied.

Referring to FIG. 1A, a user may be viewing content from an English translation of the book "Metamorphosis" by Franz Kafka (such as the translation from German provided by David Wyllie) via a user interface 400 of an application with learning tools such as described herein. The application may have received the content from a local storage, a cloud storage, or via a web resource as described with respect to FIG. 2; and the content, and interface, may be displayed via a computing device such as described with respect to computing device 210 of FIG. 2. Reading features may be accessed via a menu available through interaction (401) with, for example, icon 402. The menu can provide reading features that can enable a user to select apply any number of features to the whole document or parts of the document. The reading features can include learning features, as well as translation actions.

In preparation of applying any learning features (or translation actions), the application may identify boundaries of words (e.g., boundary 404) and boundaries sentences (e.g., boundary 406) of at least a portion of the content (e.g., displayed content 410). In some cases, the application performs the processes described with respect to processes 110A of FIGS. 1A-1B, which include identifying the boundaries of the words and sentences. The application may perform the processes 110A or identification (operation 302 described with respect to FIG. 3) at the time of receipt of the content, prior to or synchronously with the displaying of the content, or during a prior access/consumption session of the content. In some cases, another application or service performs the processes described with respect to processes 110A of FIGS. 1A-1B.

Figure 4B:
Figure 5A:
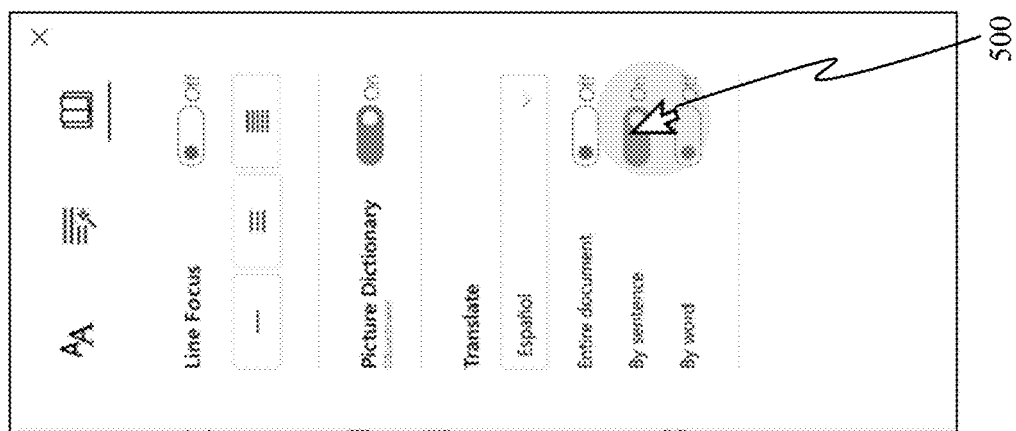
FIGS. 5A-5D illustrate an example scenario for real-time language switching on a per sentence basis.
Figure 4C:
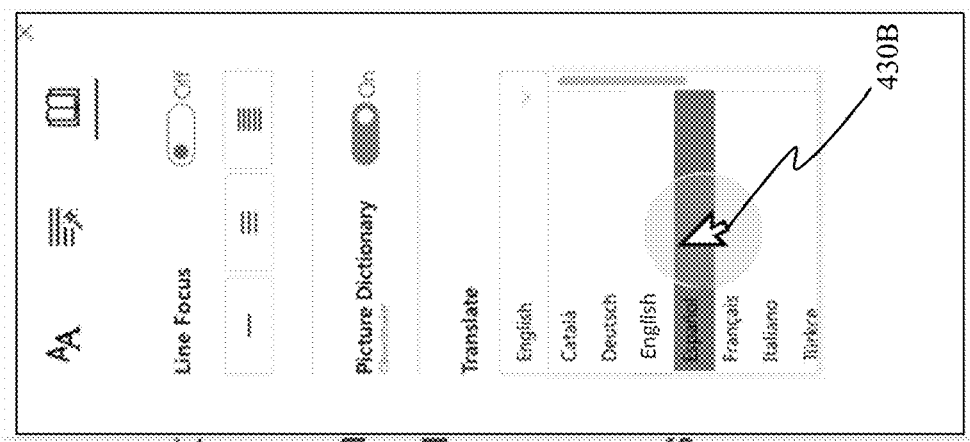

As shown in FIGS. 4B and 4C, a user can select a language for translating the entire document, by sentence, or by word. In some cases, other levels of granularity may be provided. For example, after the interaction 401 with icon 402 as shown in FIG. 4A, a menu 420 can be provided. The menu 420 is shown as a side pane or window over the content consumption area 422 of the user interface 400, but embodiments are not limited thereto. In the illustrated example, menu 420 includes reading features of line focus, picture dictionary, and translation. Here, the line focus is "off" and the picture dictionary is "on". As illustrated in FIGS. 4B and 4C, the application receives a selection of a language for translating when the user selects (430A, 430B) the translation language as Spanish. As shown in the scenarios of FIGS. 5A-5D then 6A-6B, the application can receive a granularity level for the unit of text that translation actions are applied.

One scenario with a selection of translation by sentence is shown in FIGS. 5A-5D. The selection of "per sentence" for this implementation can, when there is a selection within a sentence in the content consumption area 422, enable the full sentence to be translated. For example, referring to FIG. 5A, a user can select (500) the unit of text to be per sentence. Then, as illustrated in FIG. 5B, when the user selects a sentence (e.g., sentence 506) in the content consumption area 422, the user can choose to translate using the selected language, for example, by clicking (510) a contextual menu command 512. Because the system has identified the boundaries of the sentences, the sentence context is understood for translation, and the translated text 526 can be easily inserted into the space of the original text 506 as shown in FIG. 5C. As shown in FIGS. 5C and 5D, the user can return the sentence to the original language, for example by selecting (530) a contextual menu command 532.

In this implementation, the user may toggle between the two languages inline; however, in other implementations, the sentences may be shown in a separate window and side-by-side, depending on the learning features applied. Furthermore, in this scenario, the picture dictionary application to one or more words in the sentence is not applied.

One scenario with a selection of translation per word is shown in FIGS. 6A and 6B. The selection of "per word" for this implementation can, when there is a selection of a word (e.g., by interacting with the consumption area within a region showing a word), enable the word to be translated. For example, referring to FIG. 6A, a user can select (600) the unit of text to be per word. Then, as illustrated in FIG. 6B, when the user selects (610) a word (e.g., word 615) in the content consumption area 422, the application can retrieve from a picture dictionary, a pictogram associated with a tag applied to the word "bed" (e.g., operation 308), identify (when the feature is applied) pronunciation files for both the English language word and the Spanish language word (e.g., operation 310); and display, in context with the displayed portion of content 410, the word 620 in the original language ("bed") and the word 622 in the selected language "cama"), along with the pictogram 624 of "bed" and icons 626A, 626B for requesting to play the pronunciation files. The "in context" can be accomplished, for example, via a call-out window 630.

In the example scenario illustrated in FIGS. 7A-7C, a whole document application of the set of features is shown. Here, the scenario reflects visual cues available in the consumption area 422 of the user interface 400 from performing the processes described with pipeline part 110B of FIGS. 1A-1B. Referring to FIG. 7A, the user may have selected to show the syllables and parts of speech features for the displayed content 410 (see e.g., feature selections 224 of FIG. 2). Here, the user did not include labels, but instead has each part of speech identified using color (not shown in color). For example, nouns 700 are shown in one color, while verbs 710 are shown in another color. In addition, breaks 720 are shown to illustrate syllables.

From the state with the visual cues of the features of syllables and parts of speech, the user may select to open a menu to apply other reading features, with a similar interaction 730 with icon 402 as described with respect to interaction 401 of FIG. 4A. Here, the user selects (740) entire/whole document option for translating the text. Thus, in response to that selection, the text is translated and the features are applied to the translated text 750, where nouns 700 are shown in the one color, verbs 710 are shown in the other color, and breaks 720 are shown to illustrate syllables.

It should be understood that although only the whole document application scenario of FIGS. 7A-7C shows the learning features of syllables and parts of speech, these visual cues can be provided on a per word or per sentence basis.

Figure 8:
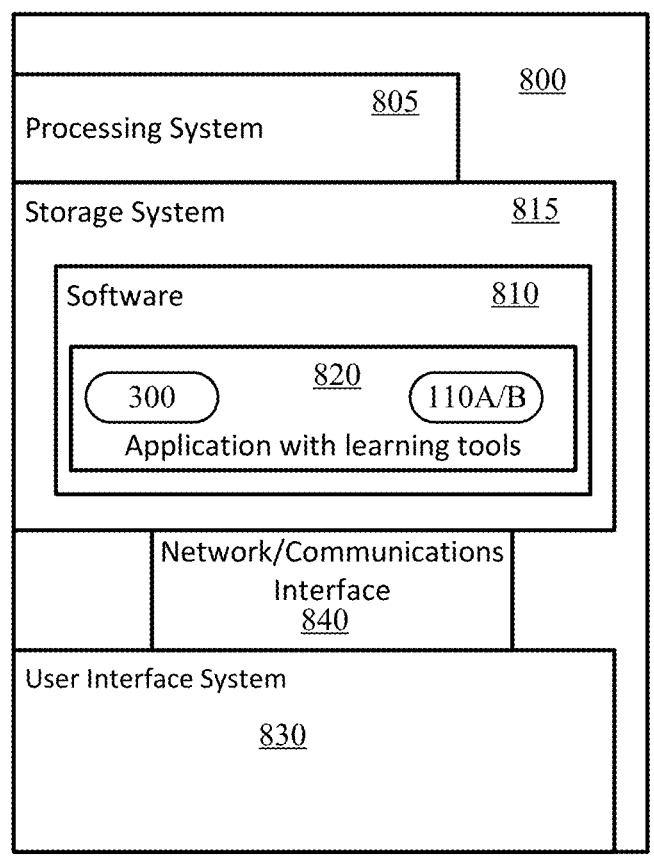
FIG. 8 illustrates components of an example computing device that may carry out the described processes.

FIG. 8 illustrates components of an example computing device that may carry out the described processes. Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of processors of the processing system 805 include general purpose central processing units (CPUs), graphics processing units (GPUs), field programmable gate arrays (FPGAs), application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs, including content consumption applications or other applications with learning tools 820. Application 820 can perform processes 110A-110B and/or 300 as described with respect to FIGS. 1A-1B and FIG. 3, respectively. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Storage system 815 may comprise any computer readable storage media readable by the processing system 805 and capable of storing software 810 including the application 820.

Storage system 815 may include volatile and nonvolatile memories, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case does storage media consist of transitory, propagating signals.

Storage system 815 may be implemented as a single storage device but may also be implemented across multiple storage devices or sub-systems co-located or distributed relative to each other. Storage system 815 may include additional elements, such as a controller, capable of communicating with processing system 805.

The system can further include user interface system 830, which may include input/output (I/O) devices and components that enable communication between a user and the system 800. User interface system 830 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 830 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

A natural user interface (NUI) may be included as part of the user interface system 830 for a user (e.g., user 200) to input feature selections. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on the display (not shown) in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface.

Network interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A reader device comprising:
    a display;
    one or more processors;
    a storage system; and
    instructions stored on the storage system that when executed by the one or more processors direct the reader device to at least:
        identify boundaries of words and sentences of displayed content by at least:
            performing syntax analysis of at least a portion of the displayed content to at least identify spaces and periods;
            categorizing words identified by the spaces and periods into categories comprising word and number;
            performing language detection to determine a character set for the words; and
            performing language-specific semantic analysis of the words;
        receive a language selection of a language for translating a selected unit of text in the displayed content, wherein the selected unit of text is a word or a sentence;
        translate the selected unit of text to the selected language;
        retrieve from a picture dictionary, a pictogram associated with a tag applied to the word or at least one word from the sentence of the selected unit of text;
        generate pronunciation files for both an original language of the selected unit of text and the selected language; and
        display, in context with the displayed content, the selected unit of text in the original language and the selected language, the pictogram, and an icons for requesting to play the pronunciation files via a call-out window.

2. The reader device of claim 1, wherein the displayed content comprises text in at least two languages.

3. The reader device of claim 1, further comprising instructions that direct the reader device to:
    apply a same feature to the translated unit of text as currently applied to the selected unit of text in the original language.

4. The reader device of claim 3, wherein the feature comprises one or both of:
    indicating part of speech; and
    indicating syllables.

5. The reader device of claim 1, further comprising instructions that direct the reader device to:
    identify parts of speech and syllables of each word; and
    tag words with their part of speech and entity identifier.

6. The reader device of claim 5, further comprising instructions that direct the reader device to:
    receive a command to display a learning tool feature for the displayed content; and
    display the part of speech or syllables of the displayed content.

7. A method comprising:
    receiving content;
    identifying boundaries of words and sentences of at least a portion of the content, wherein the identifying the boundaries of words and sentences of the at least the portion of the content comprises:
        performing syntax analysis of the at least the portion of the content to at least identify spaces and periods;
        categorizing words identified by the spaces and periods into categories comprising word and number;
        performing language detection to determine a character set for the words; and
        performing language-specific semantic analysis of the words;
    receiving a selection of a language for translating a selected unit of text from a displayed portion of the content;
    translating the selected unit of text to the selected language, wherein the selected unit of text is a word or a sentence;
    retrieving from a picture dictionary, a pictogram associated with a tag applied to the word forming the selected unit of text or at least one word from the sentence forming the selected unit of text;
    generating pronunciation files for both an original language of the selected unit of text and the selected language; and
    displaying, in context with the displayed portion of the content, the selected unit of text in the original language and the selected language, the pictogram, and icons for requesting to play the pronunciation files via a call-out window.

8. The method of claim 7, further comprising:
applying at least one feature to at least the portion of the content; and
applying a same at least one feature to the translated unit of text.

9. The method of claim 8, wherein the feature comprises one or both of:
indicating part of speech; and
indicating syllables.

10. The method of claim 7, further comprising:
identifying the parts of speech and syllables of each word; and
tagging words with their part of speech and entity identifier.

11. The method of claim 7, wherein translating the selected unit of text to the selected language comprises:
communicating with a translation service to obtain a translation of the selected unit of text to the selected language.

12. The method of claim 7, wherein the content comprises text in at least two languages.

13. A computer-readable storage medium having instructions stored thereon that when executed by a processor, direct the processor to at least:
receive content comprising at least one original language;
identify boundaries of words and sentences of at least a portion of the content by at least:
performing syntaxic analysis of the at least the portion of the content to at least identify spaces and periods;
categorizing words identified by the spaces and periods into categories comprising word and number;
performing language detection to determine a character set for the words; and
performing language-specific semantic analysis of the words;
receive a selection of a language for translating a selected unit of text from a displayed portion of the content;
receive a selection of a learning feature;
apply the learning feature to the displayed portion of the content at least with respect to the selected unit of text in the original language;
translate the selected unit of text to the selected language;
apply the learning feature to the selected unit of text in the selected language; and
wherein when the selected unit of text is a word:
retrieve from a picture dictionary, a pictogram associated with a tag applied to the word;
generate pronunciation files for both an original language of the word and the selected language; and
display, in context with the displayed portion of the content, the word in the original language and the selected language, the pictogram, and icons for requesting to play the pronunciation files via a call-out window.

14. The medium of claim 13, wherein when the selected unit of text is a sentence:
display the selected unit of text in the selected language in place of the selected unit of text in the original language.

15. The medium of claim 13, wherein the instructions further direct the processor to, when the selected unit of text is the sentence:
retrieve from the picture dictionary, a pictogram associated with a tag applied at least one word from the sentence forming the selected unit of text;
generate pronunciation files for both an original language of the selected unit of text and the selected language; and
display, in context with the displayed portion of the content, the selected unit of text in the original language and the selected language, the pictogram, and icons for requesting to play the pronunciation files.

16. The medium of claim 13, wherein the content comprises text in at least two languages.

17. The medium of claim 13, wherein the learning feature comprises one or both of:
indicating part of speech; and
indicating syllables.

18. The medium of claim 17, further comprising instructions that direct the processor to:
identify the part of speech and syllables of each word; and
tag words with their part of speech and entity identifier.

* * * * *